(12) United States Patent
Lee et al.

(10) Patent No.: US 10,436,467 B2
(45) Date of Patent: Oct. 8, 2019

(54) TEMPERATURE CONTROL METHOD AND APPARATUS

(71) Applicant: Samsung Electronics Co., Ltd., Suwon-si, Gyeonggi-do (KR)

(72) Inventors: Dong Seop Lee, Suwon-si (KR); Sungmok Seo, Suwon-si (KR); Kwanwoo Song, Yongin-si (KR); Hyejung Cho, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 14/833,702

(22) Filed: Aug. 24, 2015

(65) Prior Publication Data

US 2016/0054021 A1    Feb. 25, 2016

(30) Foreign Application Priority Data

Aug. 25, 2014    (KR) .......................... 10-2014-0110831

(51) Int. Cl.
*F24F 11/30* (2018.01)
*G05B 15/02* (2006.01)
(Continued)

(52) U.S. Cl.
CPC .............. *F24F 11/30* (2018.01); *F24F 11/62* (2018.01); *F24F 11/64* (2018.01); *G05B 15/02* (2013.01);
(Continued)

(58) Field of Classification Search
CPC .............. F24F 11/006; F24F 2011/0063; F24F 2011/0073; G05B 15/02; G05D 23/1917
See application file for complete search history.

(56) References Cited

U.S. PATENT DOCUMENTS

| 5,924,486 A | 7/1999 | Ehlers et al. |
| 8,090,477 B1 * | 1/2012 | Steinberg ........... G05D 23/1923 700/276 |

(Continued)

FOREIGN PATENT DOCUMENTS

| CN | 1278339 A | 12/2000 |
| CN | 1863020 A | 11/2006 |

(Continued)

OTHER PUBLICATIONS

Office Action dated Mar. 5, 2019, issued in the Chinese Application No. 201580046038.5.

(Continued)

*Primary Examiner* — Brian W Wathen
*Assistant Examiner* — Brian T McMenemy
(74) *Attorney, Agent, or Firm* — Jefferson IP Law, LLP

(57) ABSTRACT

A method and an apparatus for controlling a temperature based on scheduling of an indoor temperature are provided. The apparatus obtains set temperature history information of an air handling unit from previously stored information. The set temperature history information is mapped to weather factor history information about at least one weather factor. The apparatus also obtains weather factor information regarding a scheduling target time. Based on the obtained set temperature history information and the obtained weather factor information, the apparatus schedules a set temperature of the air handling unit with regard to the scheduling target time. The present disclosure relates to a sensor network, Machine Type Communication (MTC), Machine-to-Machine (M2M) communication, and technology for Internet of Things (IoT) and may be applied to intelligent services based on the above technologies, such as smart home, smart building, smart city, smart car, connected car, healthcare, digital education, smart retail, and security services.

18 Claims, 9 Drawing Sheets

(51) Int. Cl.
*F24F 11/64* (2018.01)
*F24F 11/62* (2018.01)
*G05D 23/19* (2006.01)
*G05D 23/00* (2006.01)
*F24F 11/61* (2018.01)
*F24F 130/10* (2018.01)
*F24F 130/00* (2018.01)
*F24F 120/10* (2018.01)

(52) U.S. Cl.
CPC .......... *G05D 23/1917* (2013.01); *F24F 11/61* (2018.01); *F24F 2120/10* (2018.01); *F24F 2130/00* (2018.01); *F24F 2130/10* (2018.01)

(56) References Cited

U.S. PATENT DOCUMENTS

| | | | |
|---|---|---|---|
| 8,172,153 B1 | 5/2012 | Kennedy et al. | |
| 9,014,996 B2* | 4/2015 | Kamel | H02J 13/0006 |
| | | | 702/62 |
| 2003/0065472 A1* | 4/2003 | Eckel | H05B 37/02 |
| | | | 702/130 |
| 2006/0255165 A1 | 11/2006 | Ha | |
| 2010/0282857 A1* | 11/2010 | Steinberg | F24F 11/0001 |
| | | | 236/49.3 |
| 2011/0046792 A1* | 2/2011 | Imes | F24F 11/63 |
| | | | 700/278 |
| 2011/0130881 A1 | 6/2011 | Nanami | |
| 2012/0016524 A1* | 1/2012 | Spicer | G05B 15/02 |
| | | | 700/276 |
| 2012/0253525 A1 | 10/2012 | Suzuki | |
| 2013/0018513 A1 | 1/2013 | Metselaar | |
| 2013/0041515 A1* | 2/2013 | Wang | H01L 31/0521 |
| | | | 700/287 |
| 2013/0134229 A1* | 5/2013 | Jang | F24F 11/89 |
| | | | 236/44 C |
| 2013/0158721 A1* | 6/2013 | Somasundaram | G05D 23/1917 |
| | | | 700/276 |
| 2013/0313331 A1 | 11/2013 | Warren et al. | |
| 2014/0316581 A1* | 10/2014 | Fadell | F24F 11/0009 |
| | | | 700/276 |
| 2015/0142179 A1* | 5/2015 | Ito | F24F 11/30 |
| | | | 700/276 |
| 2015/0300892 A1* | 10/2015 | Malhotra | G01K 13/00 |
| | | | 700/276 |

FOREIGN PATENT DOCUMENTS

| | | | |
|---|---|---|---|
| CN | 101667016 A | 3/2010 | |
| CN | 102375443 A | 3/2012 | |
| CN | 103134137 A | 6/2013 | |
| CN | 103196203 A | 7/2013 | |
| CN | 103994551 A | 8/2014 | |
| EP | 1025474 A1 | 8/2000 | |
| JP | H02-21149 A | 1/1990 | |
| JP | H08-303833 A | 11/1996 | |
| JP | 2006-057908 A | 3/2006 | |
| JP | 2011-117625 A | 6/2011 | |
| JP | 2012-215308 A | 11/2012 | |
| JP | 2013-219893 A | 10/2013 | |
| JP | 2004-116947 A | 4/2015 | |
| KR | 10-0765170 B1 | 10/2007 | |
| KR | 10-2010-0086781 A | 8/2010 | |
| KR | 10-2012-0070726 A | 7/2012 | |
| KR | 10-2014-0099345 A | 8/2014 | |
| WO | WO-2013186932 A1 * | 12/2013 | F24F 11/30 |
| WO | 2014-010195 A1 | 1/2014 | |

OTHER PUBLICATIONS

Janapanes Office Action dated Jul. 12, 2019, issued in Japanese Application No. 2015-511758.

* cited by examiner

TEMPERATURE CONTROL METHOD AND APPARATUS

CROSS-REFERENCE TO RELATED APPLICATION(S)

This application claims the benefit under 35 U.S.C. § 119(a) of a Korean patent application filed on Aug. 25, 2014 in the Korean Intellectual Property Office and assigned Serial number 10-2014-0110831, the entire disclosure of which is hereby incorporated by reference.

TECHNICAL FIELD

The present disclosure relates to a method and an apparatus for controlling a temperature based on scheduling of an indoor temperature. More particularly, the present disclosure relates to a method and an apparatus for scheduling a set temperature of an air handling unit depending on conditions of a weather factor by obtaining user's set temperature history information mapped to weather factor information.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Meanwhile, in order to regulate an indoor temperature, a typical temperature controller receives set temperature information from a user in real-time, compares the received information with a current indoor temperature, and thereby determines whether to operate. This simple control mechanism requires a user to frequently input such a set temperature. Unfortunately, this may not only cause inconvenience to a user, but also fail to ensure amenities.

Therefore, a need exists for a method and an apparatus for scheduling a set temperature of an air handling unit depending on conditions of a weather factor by obtaining user's set temperature history information mapped to weather factor information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for scheduling a set temperature of an air handling unit depending on conditions of a weather factor by obtaining user's set temperature history information mapped to weather factor information.

In accordance with an aspect of the present disclosure, a temperature control method is provided. The method includes obtaining set temperature history information of an air handling unit from previously stored information, the set temperature history information being mapped to weather factor history information about at least one weather factor, obtaining weather factor information regarding a scheduling target time, and scheduling a set temperature of the air handling unit with regard to the scheduling target time, based on the obtained set temperature history information and the obtained weather factor information.

In accordance with an aspect of the present disclosure, a temperature control apparatus is provided. The apparatus includes a communication unit configured to transmit or receive information to or from a user device and an indoor equipment including an air handling unit, and a control unit configured to obtain set temperature history information of the air handling unit from previously stored information, the set temperature history information being mapped to weather factor history information about at least one weather factor, to obtain weather factor information regarding a scheduling target time, and to schedule a set temperature of the air handling unit with regard to the scheduling target time, based on the obtained set temperature history information and the obtained weather factor information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein are only used to describe specific various embodiments of the present disclosure, and are not intended to limit the present disclosure.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
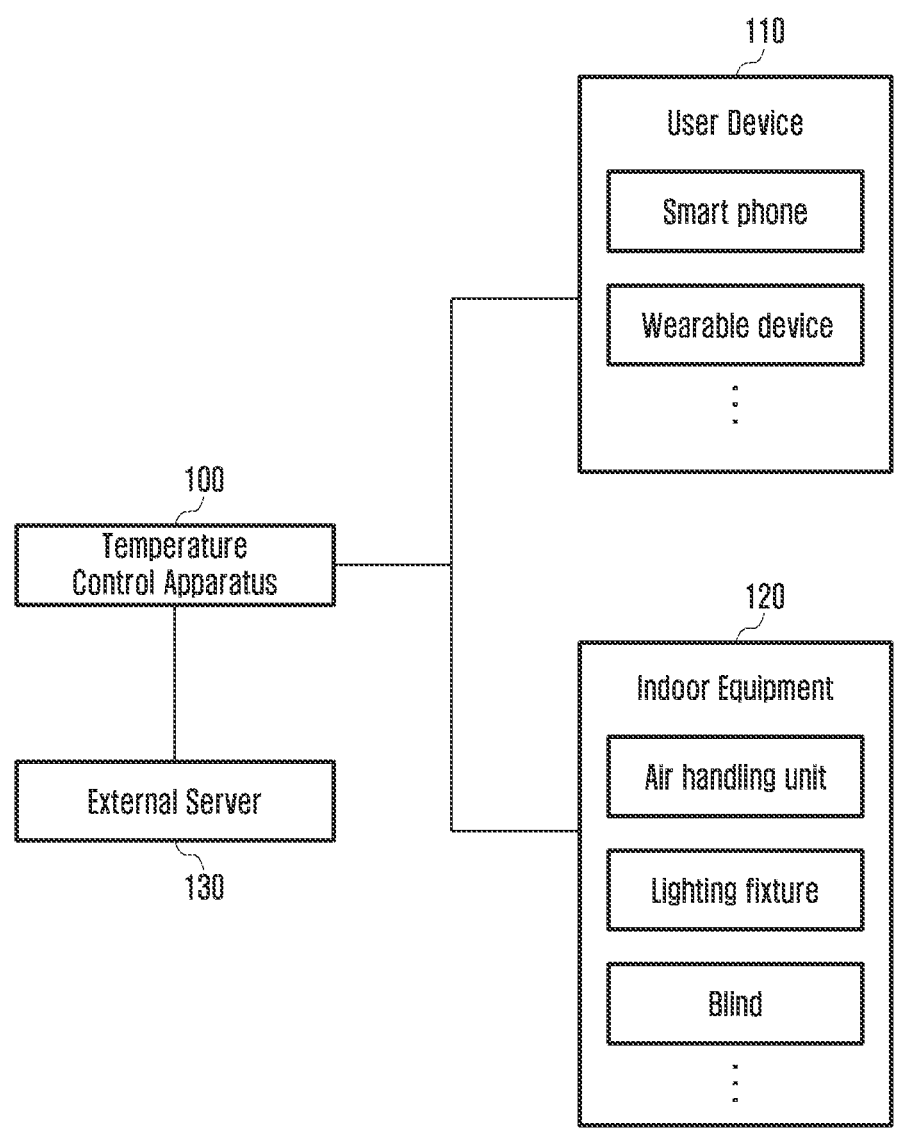
FIG. 1 is a schematic block diagram illustrating an indoor temperature control system according to an embodiment of the present disclosure.

FIG. 1 is a schematic block diagram illustrating an indoor temperature control system according to an embodiment of the present disclosure.

Referring to FIG. 1, the indoor temperature control system may include a temperature control apparatus 100, at least one user device 110, and an indoor equipment 120 that may affect an indoor temperature. This system may further include or be connected with an external server 130.

The temperature control apparatus 100 communicates with the user device 110 and the indoor equipment 120, and also controls the operation of the indoor equipment 120. Specifically, the temperature control apparatus 100 may schedule an indoor set temperature of an air handling unit by using user setting information received from the user device 110 and also using weather factor information received from the external server 130. Further, the temperature control apparatus 100 may schedule setting of the indoor equipment 120. Based on such scheduling, the temperature control apparatus 100 may control the indoor equipment 120, such as the air handling unit, a lighting fixture, a blind, and the like.

The term 'user setting information' may refer to a record of temperature information which has been set according to time by a user. The term 'weather factor information' may refer to information about forecasts of weather factors at a certain date to be scheduled and received from the external server 130. The external server 130 may include or be connected with a weather server or center for providing weather factor information.

The user device 110 may be connected with the temperature control apparatus 100 and input the user setting information to the temperature control apparatus 100. The user device 110 may include a display unit that displays a current status of the temperature control apparatus 100. The display unit may include a touch pad that allows a user to enter information with a finger or touch pen. Additionally, the user device 110 connected with the temperature control apparatus 100 may detect a user's indoor presence or absence. The user device 110 may include a mobile device, e.g., a smart phone, a wearable device, and the like. Such a wearable device may be attached to a user body, having various forms, such as glasses, a bracelet, an arm band, a pendant, and the like.

A connection between the user device 110 and the temperature control apparatus 100 may be established using a short range communication, for example, Bluetooth, Wi-Fi, Wi-Fi-Direct, ZigBee, or near field communication (NFC). Through this connection, the user device 110 may transmit setting information to the temperature control apparatus 100.

In addition, depending on whether a short range communication is disconnected, or using information about a distance between the user device 110 and the temperature control apparatus 100, the temperature control apparatus 100 may detect a user's indoor presence or absence.

The indoor equipment 120 refers to at least one type of power consuming equipment installed inside a house or a building, including, e.g., an air handling unit, multi air conditioners, an heating, ventilation, and air conditioning (HVAC) system, a light fixture, a refrigerator, a sensor, a pump, a fan, a boiler, a controller for a blind and/or a window, and the like. The temperature control apparatus 100 may communicate with the indoor equipment 120, perform scheduling for an operation control of the indoor equipment 120, and control the indoor equipment 120 based on such scheduling.

The temperature control apparatus 100 may schedule the operation of the indoor equipment 120, e.g., a set temperature of the air handling unit, by considering equipment information, operating information, and environmental status information of the indoor equipment 120 and further considering user setting information. The temperature control apparatus 100 may receive such information from the external server 130 and the user device 110. In addition, the temperature control apparatus 100 may control the operation of at least one type of equipment, based on the operation scheduling.

The term 'equipment information' may refer to the type of the indoor equipment 120, as listed above, and information about the indoor equipment itself, such as a product serial number, installation time and location, and the like. Such equipment information may further include a heating value, and the like, in a case where the indoor equipment 120 is a home appliance. The term 'operating information' may refer to an operating status of the indoor equipment 120, an operating pattern of the indoor equipment 120 according to a user or equipment location, an operating history within a certain period of time, and the like.

The temperature control apparatus 100 may obtain information for a temperature control from the external server 130. This information may include environmental status information. The term 'environmental status information' may refer to artificial environmental status information as well as weather factor information. The weather factor information may include values of weather factors, such as temperature, humidity, the amount of sunshine, the intensity of radiant heat, an air current, a wind speed, and the like. If a weather factor is temperature, the weather factor information may be, for example, nine degrees Celsius, sixty degrees Fahrenheit, and the like. The weather factor information at a certain time point, e.g., tomorrow, after a week, and the like, may be obtained from the weather forecast offered by a weather server or center. In addition, the weather factor information at the present time may be obtained through sensors included in the temperature control apparatus 100. Meanwhile, the artificial environmental status information may include information about a user's presence or absence, spatial characteristics, features of occupants, and the like. The temperature control apparatus 100 may receive the artificial environmental status information through the user device 110.

Figure 2:
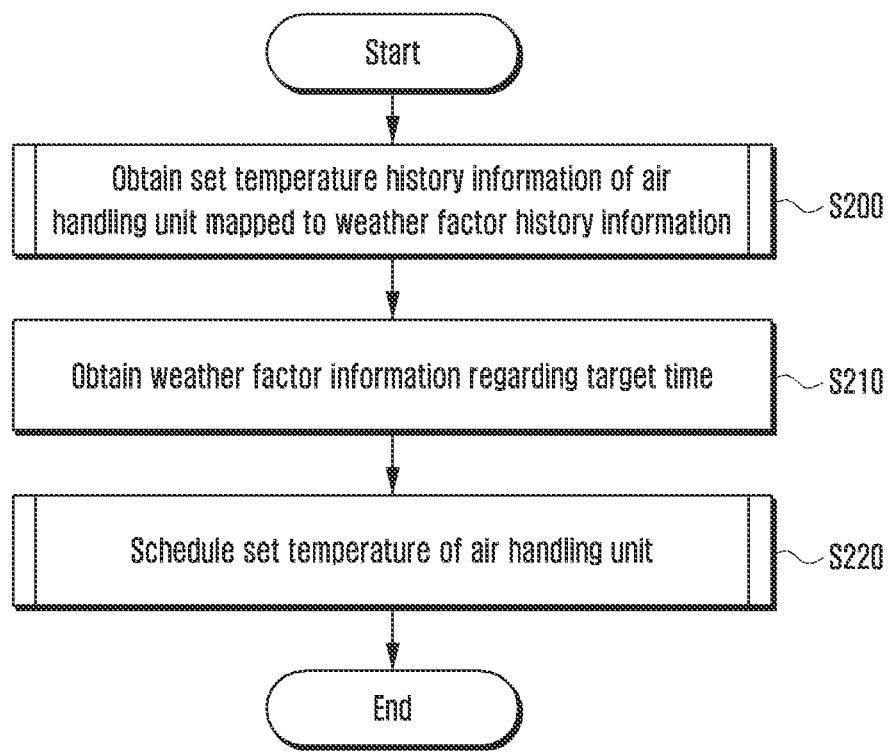
FIG. 2 is a flowchart illustrating a method for controlling a temperature according to an embodiment of the present disclosure.

FIG. 2 is a flowchart illustrating a method for controlling a temperature according to an embodiment of the present disclosure.

Referring to FIG. 2, at operation S200, the temperature control apparatus 100 may obtain set temperature history information of the air handling unit mapped to weather factor history information. A weather factor may include at least one of temperature, humidity, the amount of sunshine, the intensity of radiant heat, an air current, and a wind speed. The air handling unit is included in the indoor equipment 120. The air handling unit may receive control information based on scheduling of a set temperature from the temperature control apparatus 100. Based on the received control information, the air handing unit may control an indoor temperature. Specifically, even though not shown, the air handing unit may include an outside air cooling coil, a ventilating air cooling coil, and a blower fan. The outside air cooling coil may be used for desiccant cooling of the outside air by using cold water supplied from a central heat source. The ventilating air cooling coil may be used for cooling of heat generated from indoor lighting fixture, electronic devices, a human body, and the like. The blower fan may be used for blowing, to an indoor space, a mixture of the outside air cooled by the outside air cooling coil and the ventilating air cooled by the ventilating air cooling coil.

The weather factor information may have specific values of weather factors. The above-mentioned 'set temperature history information of the air handling unit mapped to weather factor history information' may refer to information about a history of temperature values which have been previously set by a user in connection with respective weather factors. Namely, the set temperature history information of the air handling unit may include a mapping relation between a temperature value set by a user and a corresponding weather factor. For example, when the weather factor is an outside temperature, the set temperature history information of the air handling unit mapped to weather factor history information may indicate set temperatures of 23 degrees, 22 degrees, and 21 degrees which are mapped to outside temperatures of 28 degrees, 29 degrees and 30 degrees, respectively. A process of obtaining such set temperature history information of the air handling unit will be described below with reference to FIG. 3.

Additionally, the temperature control apparatus 100 may further consider equipment information of the indoor equipment 120 when obtaining the set temperature history information. Namely, by further considering the type, and the like, of the indoor equipment 120, the temperature control apparatus 100 may obtain the set temperature history information from information stored previously. For example, in order to control a temperature of the air handling unit in view of material of a window or depending on whether blind is installed or not, the temperature control apparatus 100 may obtain the set temperature history information of the air handling unit mapped to the equipment information as well as the weather factor history information. Therefore, obtaining the set temperature history information that matches present conditions of the indoor equipment is possible, and controlling a temperature in connection with the indoor equipment is also possible. For example, if blind is installed, it is possible to obtain the set temperature history information from the same previous cases. If there is no set temperature history information that matches present conditions in pre-stored information, currently operating information of the air handling unit may be stored together with corresponding conditions so as to be used in the future.

At operation S210, the temperature control apparatus 100 obtains weather factor information for a scheduling target time. The term 'scheduling target time' may refer to a specific approaching date and/or time point (e.g., tomorrow, or 3 p.m., Jul. 28, 2014, and the like), targeted for scheduling of a set temperature to control a temperature. This scheduling target time may further indicate the appointed time or available time for obtaining the weather factor information from the external server 130.

Obtaining the weather factor information may include receiving information about weather factors from the external server 130 including or connected with a weather server or center as mentioned above. The weather factor information may include values of weather factors, such as temperature, humidity, the amount of sunshine, the intensity of radiant heat, an air current, a wind speed, and the like. The weather factor information regarding a scheduling target time may be the weather forecast offered by a weather server or center.

The weather factor information regarding a scheduling target time may include time-based weather factor information, which may include a graph in which the horizontal axis is time and the vertical axis is a weather factor. For example, if a weather factor is temperature, the time-based weather factor information may be a graph of estimated variations in temperature according to time.

At operation S220, the temperature control apparatus 100 performs scheduling for a set temperature of the air handling unit. Namely, based on the set temperature history information of the air handling unit mapped to weather factor history information and also based on the time-based weather factor information, the temperature control apparatus 100 schedules a set temperature of the air handling unit. Such a scheduling process will be described below with reference to FIG. 5.

Figure 3:
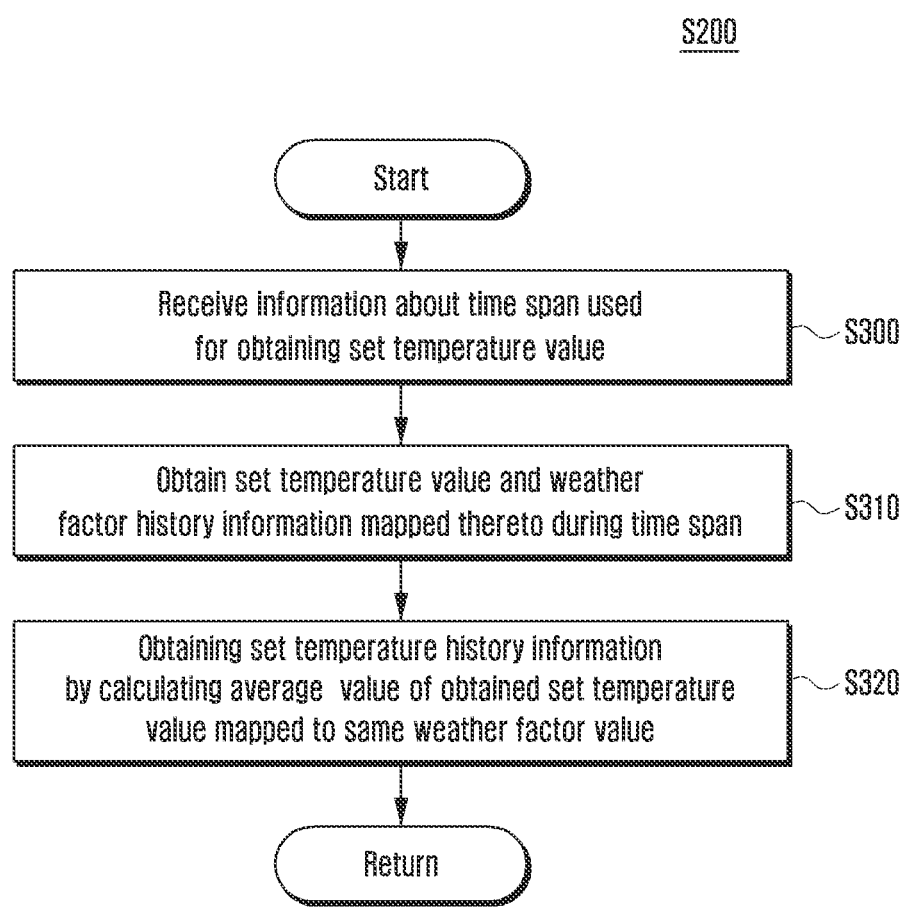
FIG. 3 is a flowchart illustrating a process of obtaining set temperature history information according to an embodiment of the present disclosure.

FIG. 3 is a flowchart illustrating a process of obtaining set temperature history information according to an embodiment of the present disclosure.

Referring to FIG. 3, a process in which the temperature control apparatus 100 obtains the set temperature history information of the air handling unit in connection with history information about at least one weather factor is illustrated.

At operation S300, the temperature control apparatus 100 receives information about a time span used for obtaining previous set temperature values of the air handling unit. A user may input this time span information to the temperature control apparatus 100 through the user device 110 by considering the above-mentioned scheduling target time. For example, if a user desires to schedule a set temperature from 10 a.m. to 8 p.m. as the scheduling target time, the user may input this target time as the time span into the temperature control apparatus 100. Additionally or alternatively, the above information about a time span may be determined based on a specific approaching date targeted for scheduling of a set temperature. For example, if a user desires to schedule a set temperature on September 27, the time span information may be from August to October.

After the time span information is received, the temperature control apparatus 100 stores weather factor information and corresponding set temperature information during the time span at operation S310. For example, if a time span determined by a user is from 10 a.m. to 6 p.m., and if a weather factor is an outside temperature, the temperature control apparatus 100 retrieves outside temperature values between 10 a.m. and 6 p.m. and corresponding set temperature values from previously stored information, and stores the retrieved values as mapping data.

Alternatively, a user may define such a mapping relation between weather factor information and set temperature information in the temperature control apparatus 100 through the user device 110. For example, a mapping relation may be defined as a set temperature of 20 degrees in a case of an outside temperature of 30 degrees and a set temperature of 19 degrees in a case of an outside temperature of 32 degrees.

In the same manner, when the weather factor information is humidity, the amount of sunshine, the intensity of radiant heat, an air current, a wind speed, and the like, the temperature control apparatus 100 stores such weather factor information and corresponding set temperature information which have been obtained and/or measured during the time span. This information may be stored in the form of table, and also two or more tables may be stored according to the types of stored weather factors. Further, this information may be represented as a dot graph having weather factor information on the horizontal axis and set temperature information on the vertical axis.

For obtaining the set temperature history information, the temperature control apparatus 100 may further consider equipment information of the indoor equipment 120. Namely, the temperature control apparatus 100 may store the set temperature information mapped to such equipment information as well as the weather factor information. For example, set temperature values mapped to weather factor values in cases of the presence and absence of a blind may be stored respectively. In addition, set temperature values mapped to weather factor values in cases of the open and closed state of a blind may be stored respectively.

At operation S320, the temperature control apparatus 100 may obtain the set temperature history information by calculating an average value of set temperature values mapped to the same weather factor value. This average value may be regarded as a value of representing the feature of set temperature values. For example, if the weather factor information is an outside temperature, and if obtained set temperature values are 18 degrees, 19 degrees and 20 degrees when the outside temperature is 25 degrees, an average value of the set temperature values is 19 degrees. The set temperature history information may refer to a set or distribution of such average values according to weather factor information.

The set temperature history information may be stored in the form of table, and also two or more tables may be stored according to the types of stored weather factors. Further, this information may be represented as a line graph having weather factor information on the horizontal axis and set temperature information on the vertical axis. To represent by such a line graph may be referred to as the weather to temperature (W2T) modeling.

Figure 4:
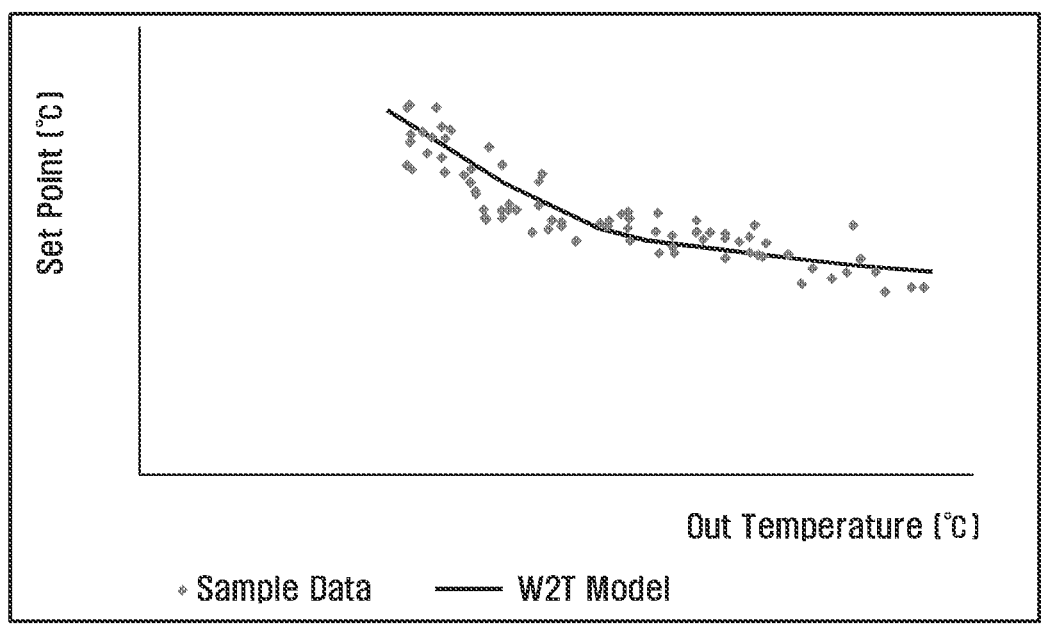
FIG. 4 illustrates obtained set temperature history information according to an embodiment of the present disclosure.

FIG. 4 illustrates obtained set temperature history information according to an embodiment of the present disclosure.

Referring to FIG. 4, a dot graph and a line graph where the horizontal axis is an outside temperature (denoted by Out Temperature) and the vertical axis is a set temperature (denoted by Set Point) is illustrated. The dot graph represents obtained set temperature values, and the line graph represents the set temperature history information obtained by calculating an average value of such set temperature values.

The set temperature history information indicates a correlation between weather factor information and user's set temperature values. Therefore, using this set temperature history information, the temperature control apparatus 100 may control a set temperature of the air handling unit without requiring a user to enter a real-time input of a set temperature according to variations in weather factor.

Meanwhile, the set temperature history information may be obtained according to a selected mode. Specifically, the temperature control apparatus 100 may receive mode information set by a user when receiving information about a time span at operation S300. Namely, a user may enter a selected mode as well as a time span through the user device 110. This mode information may correlate with an artificial environmental status that is not contained in the weather factor information but affects temperature setting by a user. For example, such a mode may include a sleep mode, a child mode, an aged person mode, a pregnant lady mode, an energy saving mode, and the like. If a user selects or enters specific mode information through the user device 110, the set temperature history information may be obtained in view of artificial environmental status information associated with a selected mode. The user device 110 may display selectable modes on the display unit. A user can select one of the displayed modes on the display unit by using a finger or touch pen.

For example, if a user selects a child mode, the temperature control apparatus 100 may obtain a set temperature value from only dates in which information about an occupant feature contains a child, among previously stored information. If one day a child was present, a user may have set a temperature higher or lower than usual and thus the obtained set temperature value may have reflected this feature of occupant. Therefore, at operation S310, the temperature control apparatus 100 may store the set temperature information in view of such mode information as well as the weather factor information. At operation S320, the temperature control apparatus 100 may obtain the set temperature history information by calculating an average value of set temperature values mapped to the same weather factor value and the same mode.

Additionally, as discussed above, the equipment information may be further considered when the set temperature history information is created. Like this, various artificial environmental states that are not contained in weather factors but have a possibility of affecting user's setting of an indoor temperature may be further reflected on the set temperature history information. This may further enhance preference and reliability of set temperature scheduling and also improve indoor amenities.

Figure 5:
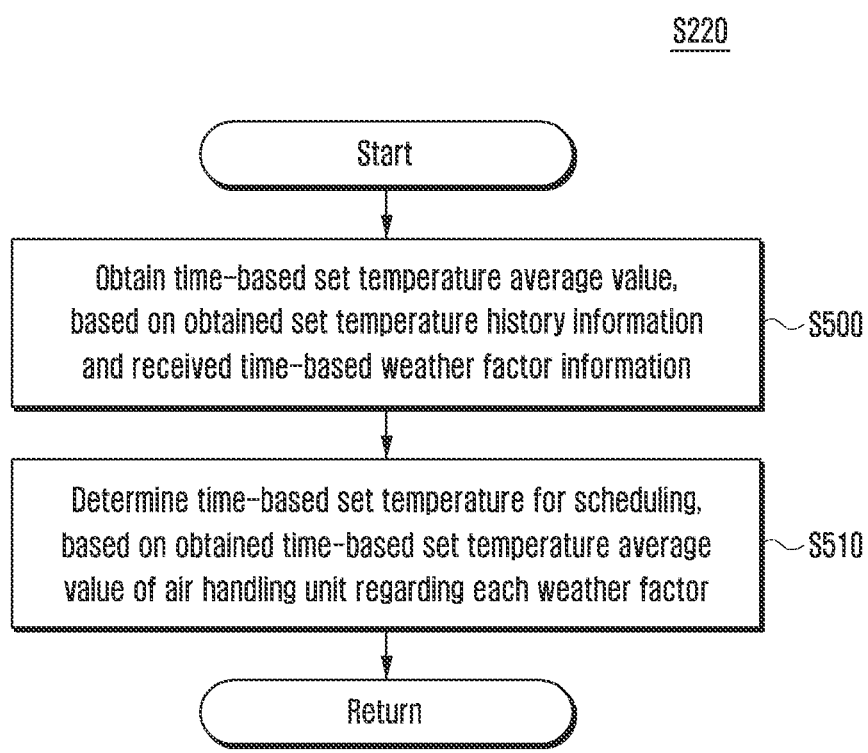
FIG. 5 is a flowchart illustrating a process of scheduling a set temperature of an air handling unit according to an embodiment of the present disclosure.

FIG. 5 is a flowchart illustrating a process of scheduling a set temperature of an air handling unit according to an embodiment of the present disclosure.

Referring to FIG. 5, a process, performed by the temperature control apparatus 100, of scheduling a set temperature of the air handling unit at a scheduling target time based on both the set temperature history information and the weather factor information which are obtained at previous operations is illustrated.

At operation S500, the temperature control apparatus 100 may obtain a time-based set temperature average value, based on the obtained set temperature history information and the obtained time-based weather factor information. Specifically, the temperature control apparatus 100 may retrieve, from the obtained set temperature history information, the weather factor history information which is identical to the obtained weather factor information. The temperature control apparatus 100 may further retrieve, from the obtained set temperature history information, the stored average value of set temperature values mapped to the retrieved weather factor history information.

Additionally, the temperature control apparatus 100 may perform such retrieval according to each weather factor. Namely, time-based set temperature average values may be obtained respectively for an outside temperature, humidity, the amount of sunshine, the intensity of radiant heat, an air current, a wind speed, and the like. As discussed below, these obtained average values may be combined in view of weights of weather factors so as to calculate a final set temperature of the air handling unit.

Let's suppose that the weather factor is an outside temperature. Let's further suppose that the time-based outside temperature information indicates an outside temperature of 25 degrees at 9 a.m., and that the set temperature history information indicates a set temperature average value is 22 degrees in a case of an outside temperature of 25 degrees. Based on the above, a set temperature average value of 9 a.m. can be obtained as 22 degrees. In this manner, set temperature average values of 9:01 a.m., 9:02 a.m., 9:03 a.m., and the like, can be obtained.

The above retrieval may be performed using a function. Specifically, the set temperature history information may be expressed as a function of y=f(x) (herein, x denotes weather factor information, and f(x) denotes an average value of set temperature values). In addition, the time-based weather factor information may be expressed as a function of y=g(x) (herein, x denotes time, and g(x) denotes weather factor information). The above-discussed retrieval may be performed by calculating a composite function of y=f(g(x)). In this manner, set temperature average values may be retrieved with regard to other weather factors.

At operation S510, the temperature control apparatus 100 may determine a time-based set temperature for scheduling, based on the obtained time-based set temperature average value of the air handling unit regarding at least one weather factor. Namely, the time-based set temperature average value of the air handling unit may be obtained for each weather factor, and the temperature control apparatus 100 may combine such average values of respective weather factors by considering certain weights of weather factors. This weight of each weather factor may be entered or selected through the user device 110 by a user. Additionally or alternatively, the weight of each weather factor may be determined based on information about influence on each a set temperature. This influence information may be offered to the temperature control apparatus 100 by the server 130. This scheduling in view of weights of weather factors may further enhance preference and reliability of set temperature scheduling and also improve indoor amenities.

A weight is allocated to each weather factor such that the sum of weights of all weather factors becomes one. A time-based set temperature at a scheduling target time may be determined as Equation 1 given below.

$$SP(t)=\alpha S_O(t)+\beta S_I(t)+\gamma S_H(t)+ \ldots \quad \text{Equation 1}$$

SP(t): set temperature of air handling unit
t: scheduling target time
α, β, γ: weight allocated to each weather factor
S(t): average value of time-based set temperature values of air handling unit regarding each weather factor
O, I, H: examples of weather factors, outside temperature, indoor temperature, and humidity Let's suppose that the temperature control apparatus 100 determines a set temperature of the air handling unit at 9:00 a.m. using Equation 1. Let's further suppose that average values of outside temperature, indoor temperature and humidity are obtained respectively as 23 degrees, 25 degrees and 20 degrees at operation S500. In addition, let's suppose that weights of outside temperature, indoor temperature and humidity are 0.4, 0.4 and 0.2, respectively. As a result of calculation using Equation 1, a set temperature of the air handling unit at 9:00 a.m. is determined as 23.3 degrees.

In this manner, time-based set temperatures of the air handling unit may be determined continuously for the entire scheduling target time. Meanwhile, average values of set temperature values of the air handling unit may be given as a time-based function. In this case as well, the time-based set temperature of the air handling unit may be determined using Equation 1.

However, if there is a user's input for a current set temperature even though the temperature control apparatus 100 has scheduled a set temperature of the air handling unit by determining time-based set temperatures as discussed above, the user's input may be considered first to control the air handling unit. The user's input may be entered through the user device 110 or using a touch pad of the temperature control apparatus 100. Like this, the temperature control apparatus 100 may not only schedule a set temperature, but also reflect a user preferring set temperature.

In addition, the temperature control apparatus 100 may adjust a scheduled set temperature of the air handling unit by further considering equipment information of the indoor equipment 120 or any other need or condition. Namely, a heating value, control information, operating information, and the like, of the indoor equipment 120, such as home appliances, may be considered to adjust the set temperature of the air handling unit. For example, while any home appliance having a higher heating value is operating, the scheduled set temperature may be adjusted so as to be reduced.

Figure 6:
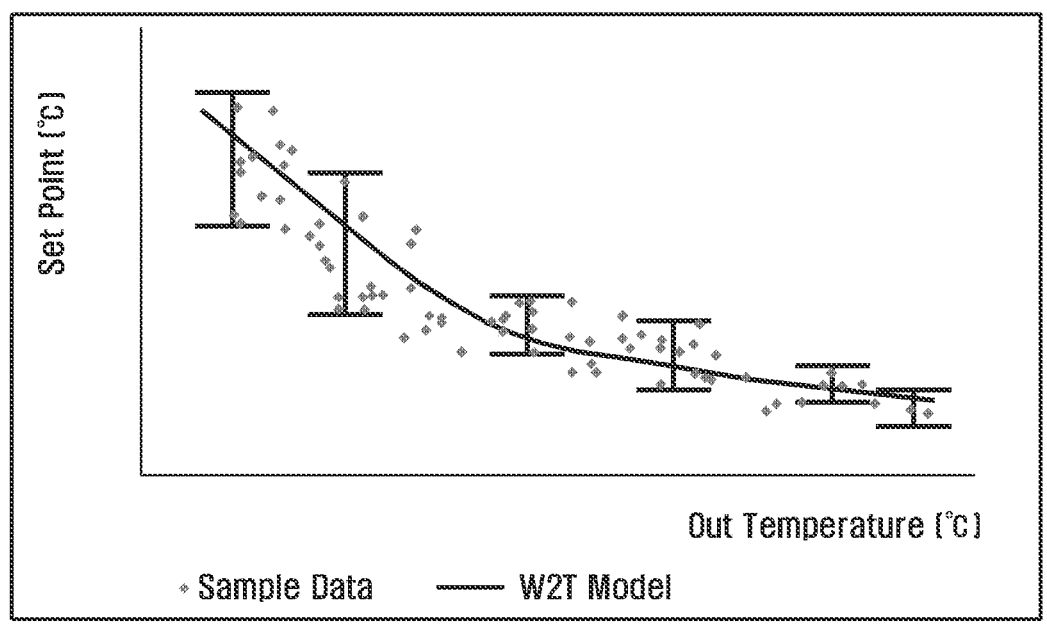
FIG. 6 illustrates an adjustment of a scheduled set temperature according to an embodiment of the present disclosure.

FIG. 6 illustrates an adjustment of a scheduled set temperature according to an embodiment of the present operation.

Referring to FIG. 6, after the time-based set temperature of the air handling unit is determined, i.e., scheduled, as shown in FIG. 5, the temperature control apparatus 100 may adjust the set temperature for the purpose of energy conservation, and the like. However, in order to avoid the degradation of amenities at this time, the temperature control apparatus 100 may analyze a distribution of the set temperature values stored above at operation S310. Namely, the temperature control apparatus 100 may obtain a distribution of the set temperature values stored regarding the same weather factor information and determine, through a statistical analysis, a permissible distribution range (also referred to as a seamless range) from which a user fails to recognize variations in temperature. This permissible distribution range may be determined based on a standard deviation, a mean deviation, a quartile deviation, and the like.

Hereinafter, let's suppose that the permissible distribution range is based on a standard deviation. Normally a standard deviation refers to a measure that is used to quantify the amount of variation or dispersion of a set of data values. A standard deviation close to 0 indicates that the data points tend to be very close to the mean of the set, while a high standard deviation indicates that the data points are spread out over a wider range of values. A standard deviation is obtained using Equation 2 given below.

$$\sigma = \sqrt{\frac{1}{n}\sum_{i=1}^{n}(x_i - m)^2} \quad \text{Equation 2}$$

x: a set temperature value regarding obtained weather factor information m: an average value of set temperature values n: the number of set temperature values regarding the same weather factor information In this case, within a range from a standard deviation plus the average value to a standard deviation minus the average value, occupants (i.e., indoor persons) may not recognize variations in temperature. Namely, this permissible distribution range may allow a user to feel pleasant.

Considering the permissible distribution range, the temperature control apparatus 100 may adjust the scheduled set temperature. Namely, the temperature control apparatus 100 may adjust an average value of time-based set temperature values for each weather factor in view of the permissible distribution range. Let's suppose that the permissible distribution range is determined using a standard deviation. If an indoor temperature value of a specific time in the obtained weather factor information is greater than an average value of the obtained time-based set temperature values at the specific time (namely, in a case of cooling), the temperature control apparatus 100 may adjust the set temperature by adding a standard deviation value to the average value at the specific time. On the contrary, if an indoor temperature value of a specific time in the obtained weather factor information is less than an average value of the obtained time-based set temperature values at the specific time (namely, in a case of heating), the temperature control apparatus 100 may adjust the set temperature by subtracting a standard deviation value from the average value at the specific time.

Based on the adjusted average value, the temperature control apparatus 100 may schedule the set temperature of the air handling unit as discussed at operation S510. This may have the effect of energy conservation while continuing to allow a user to feel pleasant.

Figure 7:
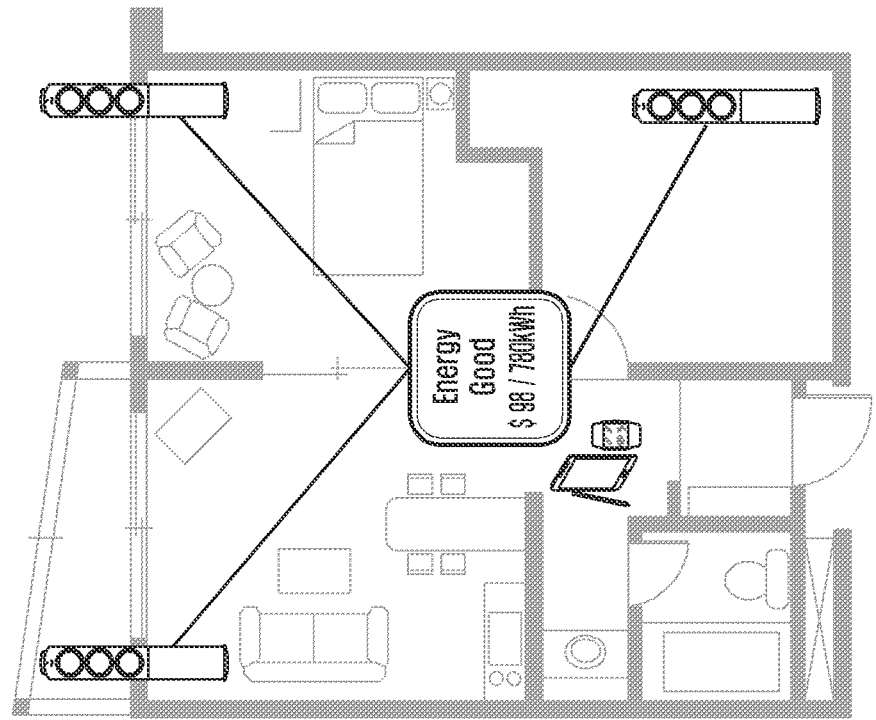
FIG. 7 illustrates a temperature control process through a control of an indoor equipment according to an embodiment of the present disclosure.
Figure 7:
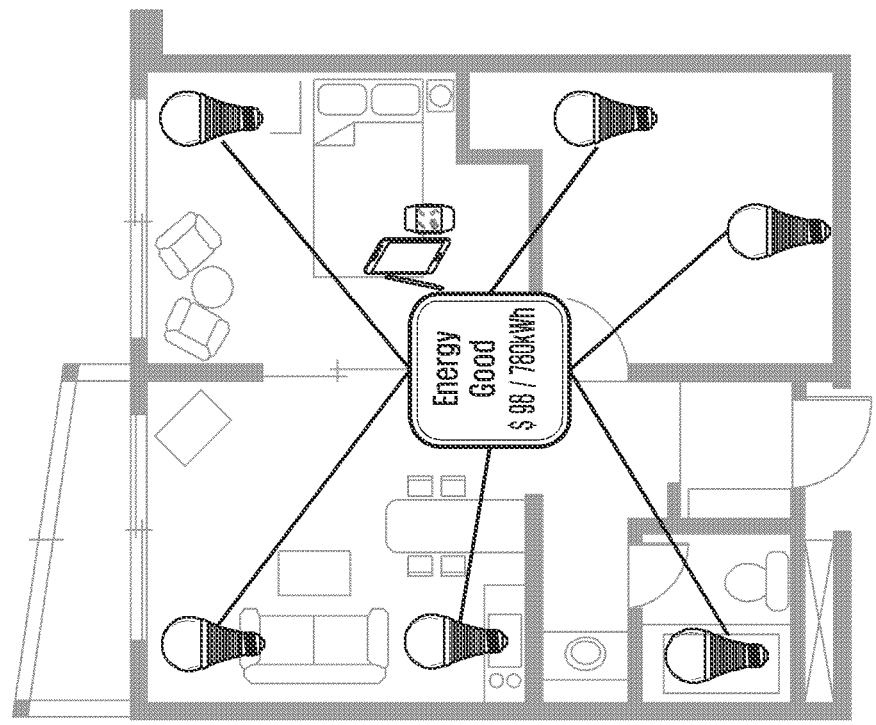

FIG. 7 illustrates a temperature control process through a control of an indoor equipment according to an embodiment of the present operation.

Referring to FIG. 7, the temperature control apparatus 100 may obtain equipment setting history information of the indoor equipment 120 for each weather factor during a time span selected by a user. The indoor equipment is controllable by the temperature control apparatus 100 and may include at least one of a blind, a window and lighting fixture. A method for obtaining the equipment setting history information may be the same as the above-discussed method for obtaining the set temperature history information. In addition, the obtained equipment setting history information may be what mapped to weather factor history information. Based on such information, the temperature control apparatus 100 may obtain a critical point of the weather factor information. This critical point refers to a point where equipment setting is changed. Alternatively, the equipment setting history information may contain such a critical point.

After obtaining weather factor information regarding a scheduling target time, the temperature control apparatus 100 may schedule equipment setting with regard to the scheduling target time, based on the obtained equipment setting history information and the obtained weather factor information. This scheduling is similar to the above-discussed scheduling regarding the set temperature of the air handling unit. The temperature control apparatus 100 may determine time-based equipment setting associated with weather factor(s) by comparing the obtained time-based weather factor information with the critical point of weather factor information.

If such determination of the time-based equipment setting conflicts according to weather factors, weights of respective weather factors may be used for that. For example, when determining whether to open or close a window, let's suppose that equipment setting is determined to open a window according to an indoor temperature but to close a window according to humidity. In this case, if weights are predefined in the order of indoor temperature>outside temperature>humidity, equipment setting for opening or closing a window may be determined to open a window. Additionally, in order to schedule the equipment setting of the same type equipment, weights may be considered. For example, in a case where there are several air handling units, related equipment setting may be determined and/or adjusted according to predefined weights. Additionally, in a case of determining whether to operate each of the same type equipment, the temperature control apparatus 100 may consider equipment information. Namely, optimal equipment for an effective control of an indoor temperature may be selected to operate considering the installation location, a heating value, a production year, and the like. This control of equipment in view of equipment information may have the effect of energy conservation.

Weights of weather factors and weights of same type equipment units may be obtained by user setting. A user may enter information about weights through the user device 110.

Further, the temperature control apparatus 100 may use time-based equipment setting information to control a set temperature of the air handling unit. Namely, scheduling of a set temperature of the air handling unit may be adjusted in view of a heating value, control information and/or operating information of home appliances among the indoor equipment. For example, if the temperature control apparatus 100 is set to operate a home appliance having a higher heating value, the scheduled set temperature of the air handling unit may be adjusted lower.

As discussed hereinbefore, the temperature control apparatus 100 may control the indoor equipment as well as the air handling unit based on each individual user's preferring pattern and/or information about each equipment unit, thus allowing a user to feel pleasant.

Figure 8:
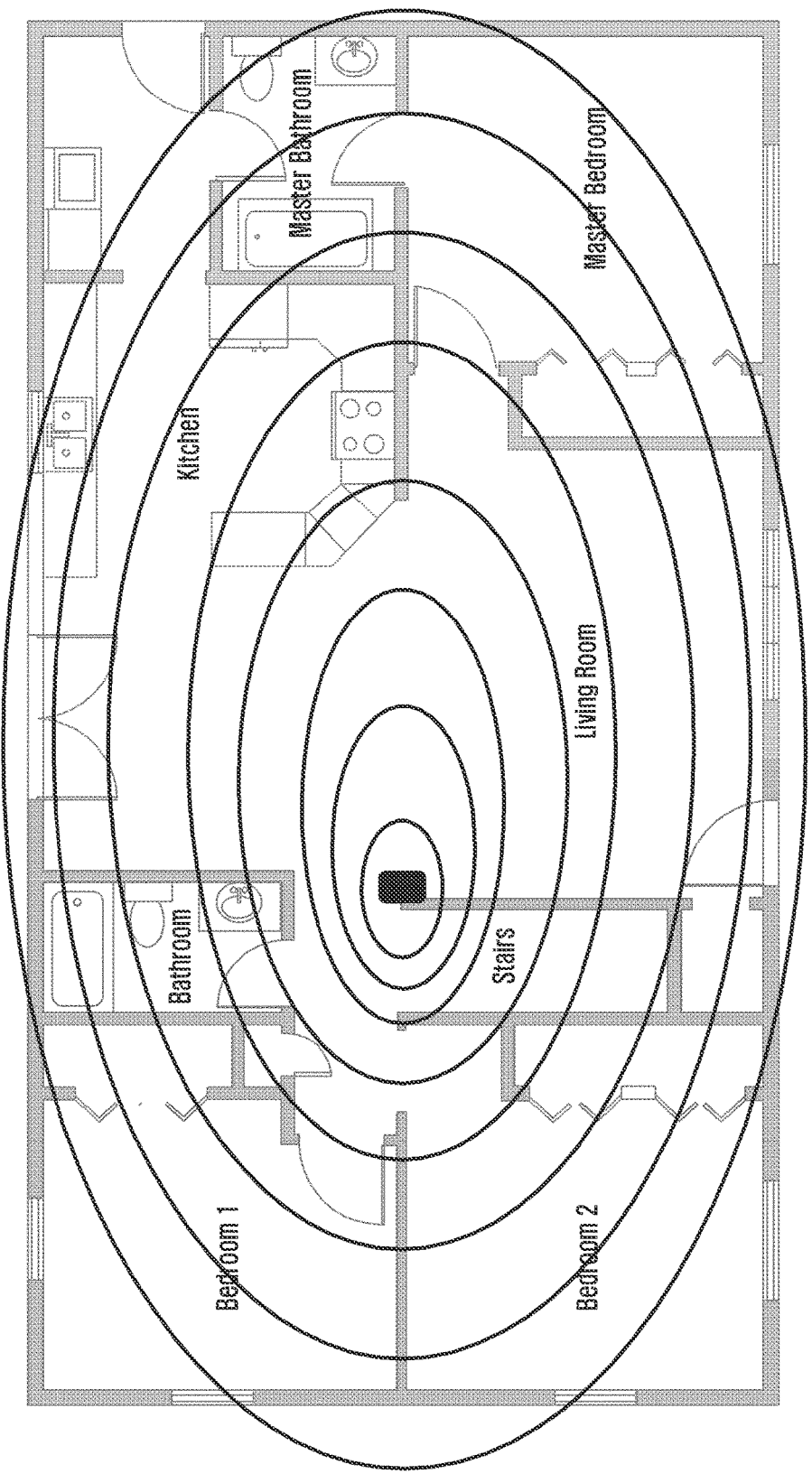
FIG. 8 is a schematic diagram illustrating a method for presence/absence detection according to an embodiment of the present disclosure.

FIG. 8 is a schematic diagram illustrating a method for presence/absence detection according to an embodiment of the present disclosure.

Referring to FIG. 8, the temperature control apparatus 100 may detect the presence or absence of users in an indoor space and control setting of an indoor equipment including the air handling unit, depending on detection results. The temperature control apparatus 100 may include a motion detection sensor as a means of detecting the presence or absence of users. In addition, the temperature control apparatus 100 may detect the presence or absence of users in an indoor space through a connection with the user device 110, a detection of indoor sounds, a detection of indoor illumination, and the like. The user device 110 may include a mobile device, e.g., a smart phone, or a wearable device. Such a wearable device may be attached to a user body, having various forms, such as glasses, a bracelet, an arm band, a pendant, and the like. A connection between the user device 110 and the temperature control apparatus 100 may be established using a short range communication, e.g., Bluetooth, Wi-Fi, Wi-Fi-Direct, ZigBee, or NFC. The temperature control apparatus 100 may detect indoor sounds and indoor illumination by using suitable sensors equipped therein.

When a short range communication is disconnected, the temperature control apparatus 100 may recognize the disconnection of a short range communication as the absence of a user. In addition, the temperature control apparatus 100 may measure a distance from the user device 110 through a connection of a wireless communication. If the measured distance is greater than a certain value, the temperature control apparatus 100 may recognize the measured distance being greater than a certain value as the absence of a user. If the measured distance is less than a certain value, the temperature control apparatus 100 may control the air handling unit. For example, if the measured distance becomes less than a certain value while the air handling unit is not operated due to the absence of a user, the temperature control apparatus 100 may start again to operate the air handling unit.

The temperature control apparatus 100 may detect indoor sounds through a sound detection sensor equipped therein. If sounds below a given size (i.e., decibel) are detected for a certain critical time, the temperature control apparatus 100 may recognize the detected sound level being below a given decibel for a certain critical time as the absence of a user. Additionally, the temperature control apparatus 100 may detect indoor illumination through an illumination detection sensor equipped therein. If illumination below a given size (i.e., lux) is detected for a certain critical time, the temperature control apparatus 100 may recognize the detected illumination being below a given lux for a certain critical time as the absence of a user. In the above cases, given sizes and certain critical times may be input from the user device 110 to the temperature control apparatus 100.

If the absence of a user is detected, the temperature control apparatus 100 may switch to a predefined mode for a control of a set temperature. The temperature control apparatus 100 may obtain information about a predefined mode through user setting. This predefined mode may include an energy saving mode, which may include a stop of the operation of the air handling unit.

As discussed above, the temperature control apparatus 100 may detect the presence or absence of users by using a connection with the user device 110, a detection of indoor sounds, or a detection of indoor illumination as well as a motion detection sensor, thus enhancing detection accuracy. Although typical motion detection technique using infrared rays has limitations in detecting the presence or absence of users according to the size and structure of building. The above-discussed technique of the present disclosure may prevent deterioration of detection accuracy. Further, depending on the detection of presence or absence of users, it is possible to switch to a predefined mode, such as an energy saving mode.

Figure 9:
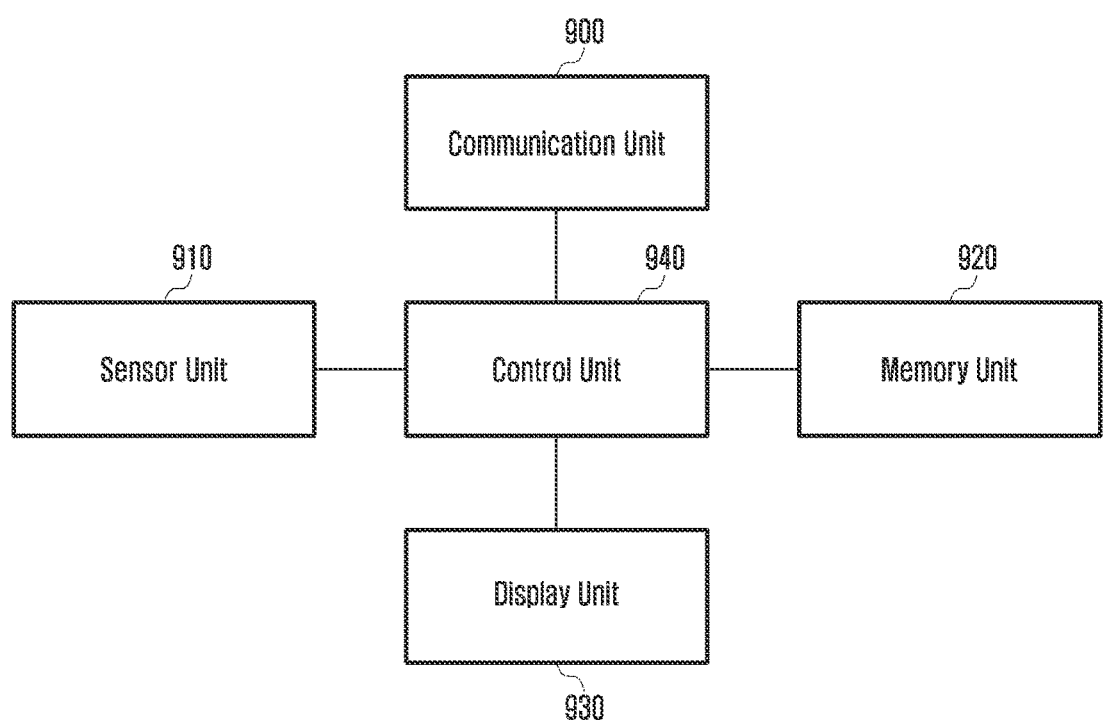
FIG. 9 is a block diagram illustrating an internal structure of a temperature control apparatus according to an embodiment of the present disclosure.

FIG. 9 is a block diagram illustrating an internal structure of a temperature control apparatus according to an embodiment of the present disclosure.

Referring to FIG. 9, the temperature control apparatus 100 may be configured to include a communication unit 900, a sensor unit 910, a memory unit 920, a display unit 930, and a control unit 940.

The communication unit 900 may be connected with the user device 110, the indoor equipment 120, and the external server 130, and thereby may transmit or receive information required for a temperature control. The communication unit 900 may use a short range communication, such as Bluetooth, Wi-Fi, Wi-Fi-Direct, ZigBee, or NFC for a connection with the user device 110. This connection between the communication unit 900 and the user device 110 may be used for detecting the presence or absence of a user in a specific space. The communication unit 900 may transmit equipment control information to the indoor equipment 120. Additionally, the communication unit 900 may receive information for a temperature control from the external server 130. This information may contain environmental status information. In addition, the communication unit 900 may receive information about the indoor equipment 120 from the external server 130. This server 130 may include a server of an equipment manufacturer. Further, the communication unit 900 may receive weather factor information from the external server 130. This server may include a server of a weather center.

The sensor unit 910 may obtain weather factor information associated with the temperature control apparatus 100. The sensor unit 910 may include, for example, a temperature sensor, a humidity sensor, an illumination sensor, a motion detection sensor, a sound detection sensor, and the like. In a case where the temperature control apparatus 100 stores a set temperature value mapped to weather factor information, the sensor unit 910 may measure weather factor information. This weather factor information may include values of weather factors, such as temperature, humidity, the amount of sunshine, an intensity of radiant heat, an air current, a wind speed, and the like. In addition, the sensor unit 910 may detect the presence or absence of users in a specific space.

The memory unit 920 may store particular information required for a control of a temperature by the temperature control apparatus 100. The memory unit 920 may store the above-discussed set temperature history information of the air handling unit mapped to weather factor information. In addition, the memory unit 920 may store the above-discussed weather factor information regarding a scheduling target time. In addition, the memory unit 920 may store any information received from the external server 130.

The display unit 930 may display information required for the temperature control apparatus 100 to control a temperature. Additionally, the display unit 930 may display an indoor temperature, an outside temperature, humidity, the amount of sunshine, and the like, detected by the sensor unit 910. In addition, the display unit 930 may display scheduled set temperature information. In addition, the display unit 930 may display a current temperature control mode, such as a sleep mode, a child mode, an aged person mode, a pregnant lady mode, an energy saving mode, and the like. Further, the display unit 930 may display a currently set temperature in the scheduled set temperature information. The display unit 930 may have a touch-sensitive form, such as a touch pad or a touch screen, so as to receive a user input. Through this touch-sensitive display unit, a user may enter any input data, such as current temperature setting information.

The control unit 940 may control the whole operation of the temperature control apparatus 100. More particularly, the control unit 940 may control the operation of obtaining set temperature history information of the air handling unit mapped to weather factor history information about at least one weather factor, the operation of obtaining weather factor information regarding a scheduling target time, and the operation of scheduling a set temperature of the air handling unit with regard to the scheduling target time, based on the obtained set temperature history information and the obtained weather factor information.

Additionally, the control unit 940 may control the operation of obtaining equipment setting history information mapped to weather factor information, and the operation of scheduling equipment setting based on the obtained equipment setting history information and the obtained weather factor information. In addition, the control unit 940 may determine the presence or absence of a user in a specific space, and in a case of the absence of a user, control the operation of switching the set temperature scheduling of the air handling unit to a predefined mode.

As fully discussed hereinbefore, the temperature control apparatus according to various embodiments of the present disclosure may obtain set temperature history information mapped to weather factor information and perform a correlation analysis for the obtained information. Further, the temperature control apparatus may schedule a set temperature of the air handling unit by using results of the correlation analysis. Thus the convenience and ease of use may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A temperature control method comprising:
  identifying set temperature history information of an air handling device, the set temperature history information including at least one first set temperature, at least one first weather information, and at least one first range information for adjusting a set temperature, each of the at least one first set temperature corresponding to each of the at least one first weather information;
  identifying second weather information in a current time;
  determining a second set temperature, of the air handling device, corresponding to the second weather information from the at least one first set temperature;
  adjusting the second set temperature based on second range information corresponding to the second set temperature from the at least one first range information; and
  controlling the air handling device based on the adjusted second set temperature,
  wherein the adjusting of the second set temperature comprises:
    adjusting, in case that an indoor temperature is greater than an average value of the second set temperature per a time, the second set temperature by adding the second range information to the average value, and
    adjusting, in case that the indoor temperature is less than the average value, the second set temperature by subtracting the second range information from the average value, and
  wherein a first set temperature is determined based on temperatures set by a user for the same weather information among the at least one first weather information.

2. The method of claim 1,
  wherein the set temperature history is determined based on information associated with indoor equipment, and
  wherein each of the first weather information and the second weather information includes at least one of temperature information, humidity information, sunshine information, radiant heat information, airflow information, or wind speed information.

3. The method of claim 1, wherein the identifying of the set temperature history information comprises:
  receiving a time duration for identifying the at least one first set temperature; and
  identifying the at least one first set temperature based on the at least one first weather information during the time duration.

4. The method of claim 1, wherein the identifying of the set temperature history information comprises:
  receiving mode setting information; and
  identifying the set temperature history information based on the received mode setting information.

5. The method of claim 3, wherein the controlling of the air handling device comprises:
  identifying second weather information per time from a server;
  determining a second set temperature per time corresponding to the second weather information per time; and
  controlling the air handling device based on the second set temperature per time.

6. The method of claim 5, wherein the determining of the second set temperature per time comprises determining the second set temperature per time based on a predetermined weight of each second weather information per time.

7. The method of claim 1, further comprising:
  obtaining equipment setting history information corresponding to the at least one first weather information; and
  scheduling equipment setting, based on the equipment setting history information and the second weather information.

8. The method of claim 7, further comprising:
  adjusting the second set temperature of the air handling device, based on the scheduled equipment setting.

9. The method of claim 1, further comprising:
  determining a presence or absence of users in a specific space; and
  switching, when the users are absent in the specific space, the air handling device to a predefined mode.

10. A temperature control apparatus comprising:
  a transceiver; and
  at least one processor configured to:
    identify set temperature history information of an air handling device, the set temperature history information including at least one first set temperature, at least one first weather information, and at least one first range information for adjusting a set temperature, each of the at least one first set temperature corresponding to each of the at least one first weather information,
identify second weather information in a current time,
determine a second set temperature, of the air handling device, corresponding to the second weather information from the at least one first set temperature,
adjust the second set temperature based on second range information corresponding to the second set temperature from the at least one first range information,
control the air handling device based on the adjusted second set temperature,
adjust, in case that an indoor temperature is greater than an average value of the second set temperature per a time, the second set temperature by adding the second range information to the average value, and
adjust, in case that the indoor temperature is less than the average value, the second set temperature by subtracting the second range information from the average value,
wherein a first set temperature is determined based on temperatures set by a user for the same weather information among the at least one first weather information.

11. The apparatus of claim 10,
wherein the set temperature history is determined based on information associated with indoor equipment, and
wherein each of the first weather information and the second weather information includes at least one of temperature information, humidity information, sunshine information, radiant heat information, airflow information, or wind speed information.

12. The apparatus of claim 10, wherein the at least one processor is further configured to:
receive a time duration for identifying the at least one first set temperature, and
identify the at least one first set temperature based on the at least one first weather information during the time duration.

13. The apparatus of claim 10, wherein the at least one processor is further configured to:
receive mode setting information, and
identify the set temperature history information based on the received mode setting information.

14. The apparatus of claim 12, wherein the at least one processor is further configured to:
identify second weather information per time from a server,
determine a second set temperature per time corresponding to the second weather information per time, and
control the air handling device based on the second set temperature per time.

15. The apparatus of claim 14, wherein the at least one processor is further configured to determine the second set temperature per time based on a predetermined weight of each second weather information per time.

16. The apparatus of claim 10, wherein the at least one processor is further configured to:
obtain equipment setting history information corresponding to the at least one first weather information, and
schedule equipment setting, based on the equipment setting history information and the second weather information.

17. The apparatus of claim 16, wherein the at least one processor is further configured to adjust the second set temperature of the air handling device, based on the scheduled equipment setting.

18. The apparatus of claim 10, wherein the at least one processor is further configured to:
determine a presence or absence of users in a specific space, and
switch, when the users are absent in the specific space, the air handling device to a predefined mode.

* * * * *